United States Patent
Li et al.

(10) Patent No.: US 7,630,324 B2
(45) Date of Patent: Dec. 8, 2009

(54) METHOD FOR BURNING MAC ADDRESS

(75) Inventors: Tao Li, Shenzhen (CN); Chun-Yang Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 687 days.

(21) Appl. No.: 10/997,573

(22) Filed: Nov. 24, 2004

(65) Prior Publication Data

US 2005/0141521 A1 Jun. 30, 2005

(30) Foreign Application Priority Data

Dec. 26, 2003 (TW) ............................. 92137065 A

(51) Int. Cl.
*H04L 12/28* (2006.01)
(52) U.S. Cl. ................................. 370/254; 370/395.54
(58) Field of Classification Search ................. 370/252, 370/254, 389, 395.54, 463
See application file for complete search history.

(56) References Cited

U.S. PATENT DOCUMENTS

| | | | |
|---|---|---|---|
| 5,798,653 A | 8/1998 | Leung, Jr. ................. 324/760 |
| 5,828,863 A * | 10/1998 | Barrett et al. .................. 703/24 |
| 5,991,275 A * | 11/1999 | Abiven et al. ................ 370/254 |
| 6,181,146 B1 | 1/2001 | Koyama ...................... 324/755 |
| 6,363,423 B1 * | 3/2002 | Chiles et al. ................. 709/224 |
| 6,745,333 B1 * | 6/2004 | Thomsen ...................... 726/23 |
| 7,194,004 B1 * | 3/2007 | Thomsen .................... 370/401 |
| 2004/0128395 A1 * | 7/2004 | Miyazaki .................... 709/229 |
| 2006/0265482 A1 * | 11/2006 | Trisno et al. ................. 709/222 |

FOREIGN PATENT DOCUMENTS

TW  90223729  11/2003

* cited by examiner

*Primary Examiner*—Hong Cho
(74) *Attorney, Agent, or Firm*—D. Austin Bonderer

(57) ABSTRACT

A method for burning MAC address is used to burn a MAC address into a network card in the course of making a network card. The method includes the following steps: Stores a plurality of MAC addresses in a burning platform. The burning platform sends a MAC address to a burning device, and then burns the MAC address to a network card through the burning device. When the burning process finishes, the burning platform reads the contents of the network card, and compares the reading contents to the burning contents. If the result is correct, the burning platform sends the MAC address and a serial number of the network card to a server, and compares them to serial numbers and MAC addresses being stored in the server to prevent the MAC address being reused.

14 Claims, 4 Drawing Sheets

METHOD FOR BURNING MAC ADDRESS

BACKGROUND OF THE INVENTION

1. Field of the Invention

The present invention relates to a method for burning MAC (Media Access Control) addresses to network cards, and more particularly to a method for burning MAC addresses to network cards during motherboard manufacturing process.

2. Description of the Related Art

A computer accesses LAN (Local Area Network) needs to use a network card which has a MAC (Media Access Control) address corresponding to itself. The MAC address is a physical symbol (hardware address) of a computer or a network device being connected to the LAN. The computer or the network device can be identified through the MAC address. When a computer is connected to the internet through LAN, it uses an IP address to receive data from the internet. When the data accesses the LAN, the IP address is transformed to a corresponding MAC address for the data to identify the position of the computer in the LAN. So the computer can receive the data successfully.

The MAC address is a 48 bits binary number. It is formed with 12 hexadecimal numbers, and corresponding to the network card one by one. Network card manufacturers need to burn the MAC address to an EPROM of the network card during the manufacturing process. Nowadays, most of the network cards are integrated on motherboards. During the motherboard manufacturing process, the manufacturers also need to burn the MAC addresses to the network cards which has being integrated on the motherboards. The most common way is to use a motherboard test machine which has a burning function to burn the MAC addresses to the network cards during the testing step of motherboard manufacturing process. However, this kind of burning method will extend the time of testing step. Because the motherboard manufacturing process is a running work, the time extending of the testing step will cause the time of each step of the motherboard manufacturing process unbalance. Moreover, the test machine doesn't have the function of valuating the correctness of the MAC addresses. If the burning step is fail, it may affect the following steps.

Thus, an improved method for burning MAC addresses to network cards is desired.

BRIEF SUMMARY OF THE INVENTION

Accordingly, an object of the present invention is to provide a method for conveniently burning MAC addresses to network cards.

Another object of the present invention is to provide a method for valuating the MAC addresses which have been burned.

To achieve the above objects, a method for burning MAC addresses to network cards during the network cards manufacturing process includes the following steps: Stores a plurality of MAC addresses in a burning platform. The burning platform sends a MAC address to a burning device, and then burns the MAC address to a network card through the burning device. When the burning process finishes, the burning platform reads the contents of the network card, and compares the reading contents to the burning contents. If the result is correct, the burning platform sends the MAC address and a serial number of the network card to a server, and compares them to serial numbers and MAC addresses being stored in the server to prevent the MAC address being reused.

Other objects, advantages and novel features of the present invention will become more apparent from the following detailed description when taken in conjunction with the accompanying drawings, in which:

DETAILED DESCRIPTION OF THE INVENTION

Figure 1:
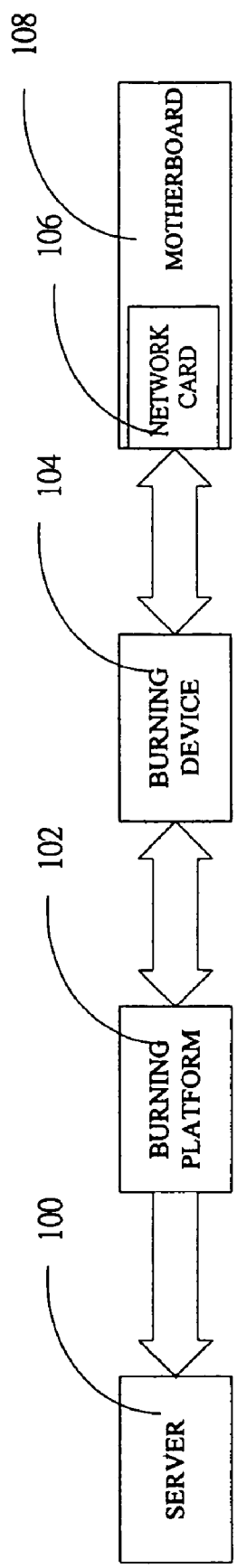
FIG. 1 is a diagram of a system of a method for burning a MAC address to a network card in accordance with the present invention.

Referring to FIG. 1, a MAC address burning system in accordance with a preferred embodiment of the present invention comprises a server 100, a burning platform 102, a burning device 104, and a network card 106 integrated on a motherboard 108. The server stores serial numbers of a plurality of network cards and a plurality of MAC addresses as a previously burned-in record, then connects with the burning platform 102. Typically, the burning platform 102 is a computer, which controls the whole burning process with network. The burning platform 102 stores a section of MAC addresses which includes a plurality of MAC addresses thereof, e.g. a section of MAC addresses is "512E6H37B000" to "512E6H37BFFF", so a number of MAC addresses included in the section of MAC addresses is: $16^3 = 4096$.

Because each network will use a MAC addresses, so after a burning process, the number of MAC addresses is decreased by one. The number of MAC addresses will be described as a variable K in the following description. The burning device 104 connects with the print port of burning platform 102 to receive MAC addresses, and burning the MAC address to the network card 106.

Figure 2:
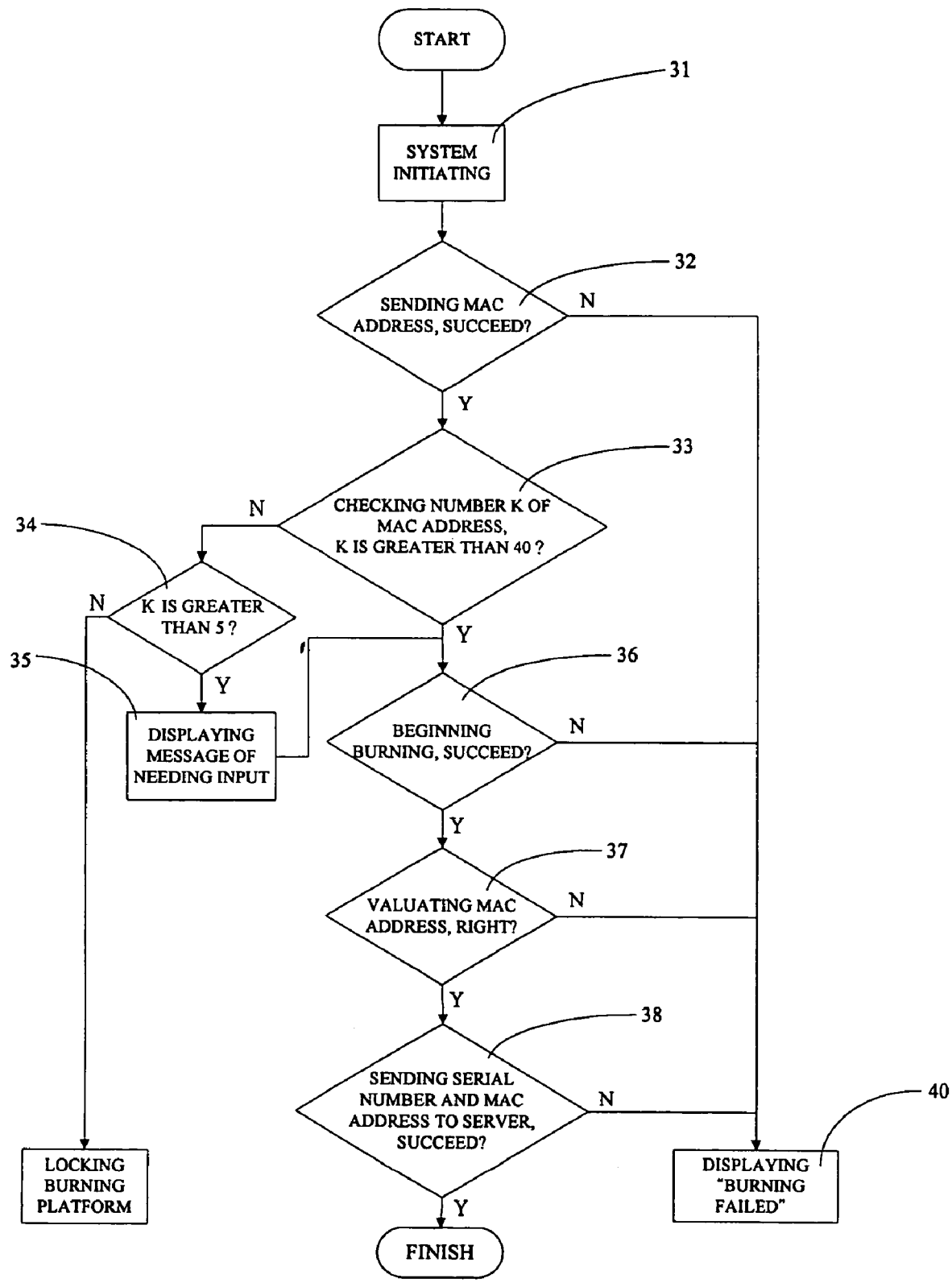
FIG. 2 is a diagram of a whole process of a method for burning MAC address with the system of FIG. 1.

Referring to FIG. 2, the burning process begins with step 31. In step 31, the burning system is initiated to prepare for burning. Then the process turns to step 32, the burning platform 102 sends one MAC address which lies in the addresses section stored therein to its memory. If step 32 fails, the process goes to step 40, in which the burning platform 102 displays "Burning Failed" on its display and turns to next burning process of other motherboards. If step 32 is successful, the process turns to step 33, the burning platform 102 checks the number K of MAC addresses lying in the addresses section after sending one MAC address, and compares K to a first predetermined value, e.g. 40, which means the MAC addresses available and lying in the addresses section will be used up soon. If K is greater than the first predetermined value, the process turns to step 36 to begin to burn the MAC address to the network card 106. If K is less than the first predetermined value, the process turns to step 35, the burning platform compares K to a second predetermined value, e.g. 5, which means the MAC addresses available and lying in the addresses section will be used up immediately. If K is greater than the second predetermined value, the process will go to step 34, the burning platform 102 displays a message of "needing input" then goes to step 36. This message indicates a need to input a new section of MAC addresses to the burning platform 102. If the new section of MAC addresses is not input to the burning platform 102, as the burning process continues, K is decreased continually. If K is less than the second predetermined value, the burning platform 102 is locked, and the process is finished. In step 36, the burning device 104 begins to burn the MAC address to the network card 106. The burning platform 102 checks the statue of network card 106 to confirm the burning is successful or not. The process turns to step 37 if the burning is successful, or else the process turns to step 40. In step 37, the burning platform 102 valuates the MAC address burned to the network card 106, continues to step 38 if the result is correct, or else the process turns to step 40. In step 38, the burning platform scans a bar code of the network card 106 to get a serial number of the network card 106, and transmits the serial number and the MAC address burned to the network card 106 to the server 100. If the transmission is successful, the server 100 stores the serial number and the MAC address, and finishes the burning process of network card 106. The process turns to step 40 if the transmission fails.

Figure 3:
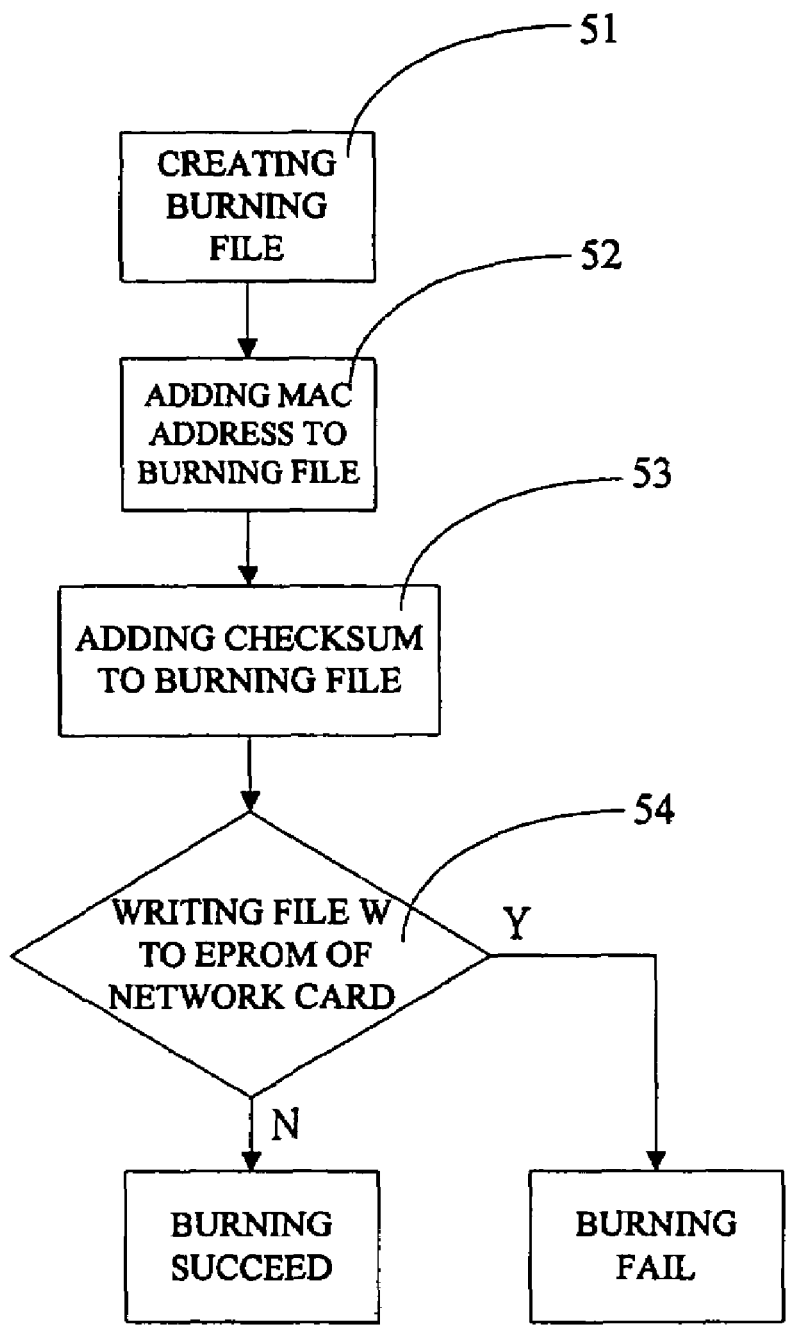
FIG. 3 shows steps of burning a network card of FIG. 2.

FIG. 3 shows a detailed process of step 36 in FIG. 2. In step 51, the burning platform 102 creates a burning file. Then the process turns to step 52, the burning platform 102 attaches the MAC address which is to be burned to the burning file. In step 53, bases on the statues of an EPROM of the network card 106, the burning platform 102 computes a checksum of the MAC address and attaches the checksum to the burning file. The burning file attached with the MAC address and the checksum is described as a file W in the following description. The burning platform 102 writes the file W to the network card 106's EPROM by the burning device 104 in step 54. If the writing is successful, the step 36 finishes successfully, or else the step 36 fails.

Figure 4:
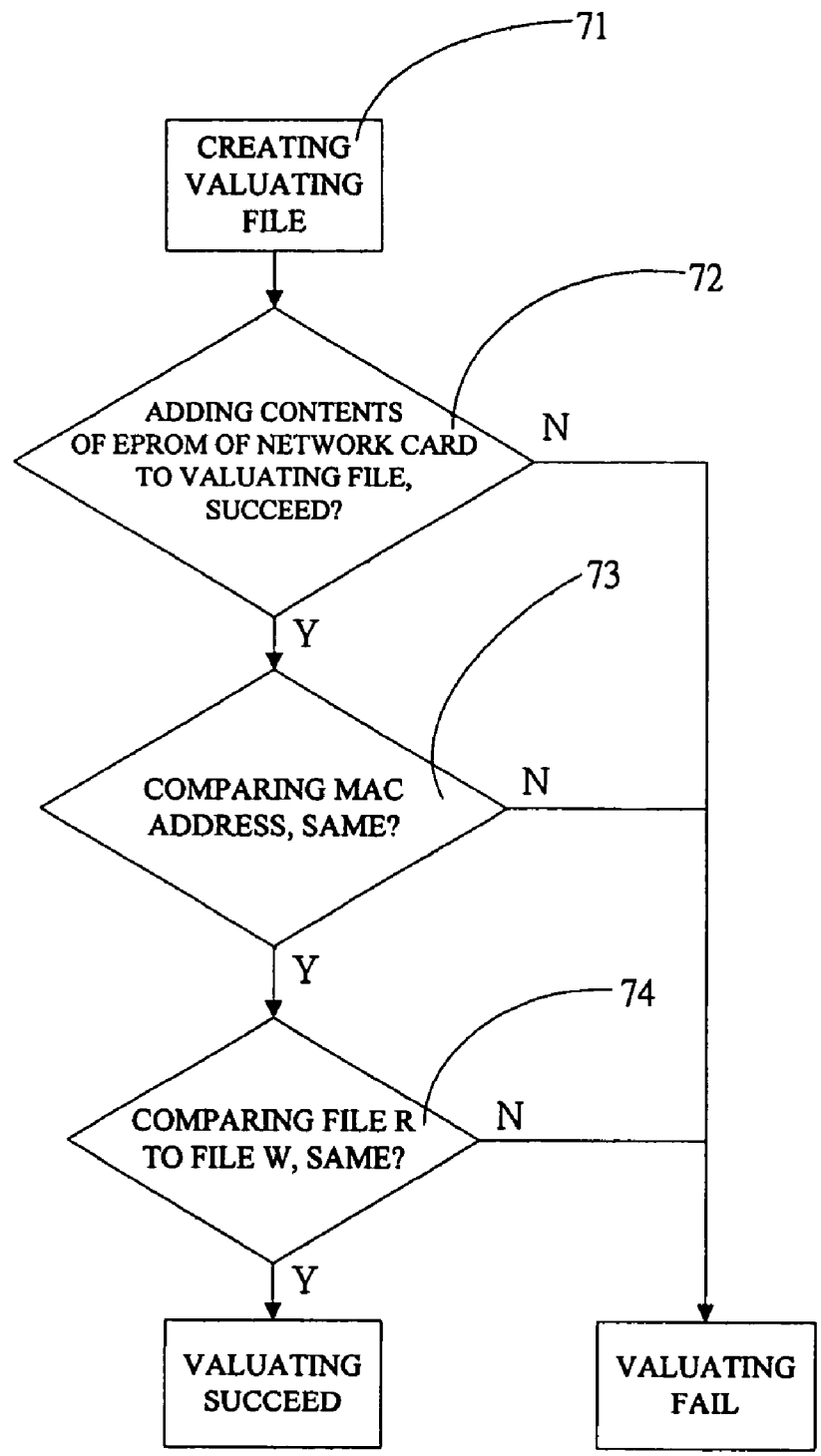
FIG. 4 shows steps of valuating contents of a network card of FIG. 2.

Because the file W is written to the EPROM of network card 106, so the contents of EPROM of network card 106 includes the MAC address and the checksum thereof. If the burning file W is damaged during the burning step 36, the checksum changes. Referring to FIG. 4, a detailed process of step 37 in FIG. 2 is shown. In step 71, the burning platform 102 creates a valuating file R. Then the process turns to step 72, the burning platform 102 reads the contents of EPROM of network card 106, and attaches them to the valuating file R. If step 72 is successful, the process turns to step 73, or else step 37 fails. In step 73, the burning platform compares the MAC address of the file W to the MAC address of the file R. If both of the MAC addresses are same, it means the MAC address of the network card 106 is right, the process turns to step 74, or else step 37 fails. In step 74, the burning platform compares the file R to the file W. If the file R is the same as the file W, it means the file W is written to the network card correctly and step 37 is successful. If the file R is not the same as the file W, the burning contents is damaged during the burning step 36, step 37 fails.

By repeating the whole burning process described before, it can burn the network cards one by one continuously. When a serial number and a MAC address of the network card is transmitted to the server 100, the server 100 compares them to the serial numbers and MAC addresses stored in it to prevent one network card being burned again or one MAC address being used twice.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A method for burning a MAC address into a network card in the course of making the network card, the method comprising the steps of:
   storing a plurality of MAC addresses in a burning platform, the burning platform sending one of the MAC addresses to a burning device, and then burning said one of the MAC addresses to the network card via the burning device;
   the burning platform reading a MAC address of the network card, and comparing the address of the network card to said one of the MAC addresses which have been sent to the burning device to valuate the MAC address of the network card is correct or not;
   the burning platform sending said one of the MAC addresses and a serial number of the network card to a server, and compares them to MAC addresses and serial numbers that the server has stored to prevent MAC address to be reused;
   wherein the burning platform burns the network card through the steps of:
      creating a burning file;
      attaching said one of the MAC addresses and a checksum of said one of MAC addresses to the burning file; and
      writing the file to the EPROM of network card via the burning device.

2. The method for burning MAC address as claimed in claim 1, wherein the burning platform checks a number of MAC addresses lying in a section of the MAC addresses after sending said one of the MAC addresses to the burning device, and comparing the number to a first predetermined value, if the number is greater than the first predetermined value, the burning platform burns said MAC address into the network card through the burning device;
   if the number is less than the first predetermined value but greater than a second predetermined value, the burning platform displays a message of needing input then burns said MAC address into the network card through the burning device; if the number is less than the second predetermined value, the burning platform is locked, and the burning process is finished.

3. The method for burning MAC address as claimed in claim 1, wherein the burning platform valuates the MAC address of the network card is correct or not through the steps of:
   creating a valuating file;
   reading the content of EPROM of the network card, and attaches them to the valuating file;
   comparing said one of the MAC addresses to a MAC address of the valuating file to valuate if they are the same; and
   comparing the burning file to the valuating file.

4. The method for burning MAC address as claimed in claim 1, wherein the network card is integrated on a motherboard.

5. The method for burning MAC address as claimed in claim 1, wherein if any of the steps is failed, the burning platform displays a failed signal and jumps to a burning process of a next network card.

6. A system for burning a MAC address to a network card in the course of making the network card, the system comprising:
   a burning platform for controlling a whole burning process, the burning platform storing a plurality of MAC addresses;

a burning device connecting with the burning platform, the burning platform burning one of the MAC addresses to the network card via the burning device;

a server connecting with the burning platform, the server storing serial numbers of a plurality of network cards and a plurality of MAC addresses for preventing MAC addresses to be reused;

wherein the burning platform creates a burning file before burning said one of the MAC addresses to the network card, and attaches said one of the MAC addresses to the burning file;

wherein the burning platform valuates a MAC address of the network card being correct or not after burning said one of the MAC addresses to the network card;

wherein the burning platform attaches a checksum of said one of the MAC addresses to the burning file after attaching said one of the MAC addresses to the burning file, and writes the burning file to the EPROM of the network card via the burning device.

7. The system for burning MAC address as claimed in claim 6, wherein the burning platform creates a valuating file before valuating the MAC address of network card is correct or not, and reads contents of EPROM of the network card, then attaches them to the valuating file.

8. The system for burning MAC address as claimed in claim 7, wherein after attaching the contents of EPROM to the valuating file, the burning platform compares said one of the MAC addresses of burning file to a MAC address of the valuating file to valuate if they are the same, and compares the burning file to the valuating file to know they have the contents or not.

9. The system for burning MAC address as claimed in claim 6, wherein the network card is integrated on a motherboard.

10. The system for burning MAC address as claimed in claim 6, wherein if the MAC address of network card is not correct, the burning platform displays a filed signal and jumps to a burning process of a next network card.

11. A method for burning a media access control (MAC) address into a circuit board for network identification use thereof, comprising the steps of:

retrieving a section of MAC addresses;

transmitting one of said section of MAC addresses to a burning device;

retrieving a number of the remaining addresses of said section of MAC addresses in case that transmitting of said one of said section of MAC addresses is complete;

burning said transmitted one of said section of MAC addresses in said circuit board via said burning device; and valuating effectiveness of said burned-in one of said section of MAC addresses;

wherein the method further comprises the step of comparing said number of the remaining addresses of said section of MAC addresses with at least one predetermined value so as to send a request for supplementing another section of MAC addresses based on a result of comparing after said number-retrieving step.

12. The method as claimed in claim 11, further comprising the step of comparing said burned-in one of said section of MAC addresses with a previously burned-in record so as to identify that said burned-in one of said section of MAC addresses is exclusively used.

13. The method as claimed in claim 11, further comprising retrieving a checksum of said transmitted one of said section of MAC addresses before said valuating step and using said checksum as a valuating standard in said valuating step.

14. The method as claimed in claim 11, wherein said valuating step comprises the step of retrieving said burned-in one of said section of MAC addresses from said circuit board and comparing said burned-in one of said section of MAC addresses with said transmitted one of said section of MAC addresses.

* * * * *

UNITED STATES PATENT AND TRADEMARK OFFICE
CERTIFICATE OF CORRECTION

PATENT NO. : 7,630,324 B2
APPLICATION NO. : 10/997573
DATED : December 8, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

Signed and Sealed this

Twenty-first Day of December, 2010

David J. Kappos
*Director of the United States Patent and Trademark Office*